United States Patent [19]

Auinger et al.

[11] 4,103,217

[45] Jul. 25, 1978

[54] BRUSHLESS SYNCHRONOUS GENERATOR WITH AN EXCITER

[75] Inventors: Herbert Auinger; Walter Lang; Manfred Mader, all of Nüremberg, Fed. Rep. of Germany

[73] Assignee: Siemens Aktiengesellschaft, Munich, Fed. Rep. of Germany

[21] Appl. No.: 784,842

[22] Filed: Apr. 5, 1977

[30] Foreign Application Priority Data

Apr. 7, 1976 [DE] Fed. Rep. of Germany ....... 2615117

[51] Int. Cl.² .............................................. H02H 3/20
[52] U.S. Cl. ...................................... 322/28; 322/68; 361/21
[58] Field of Search ................. 322/28, 22, 99, 68, 322/44, 25; 361/20, 21

[56] References Cited

U.S. PATENT DOCUMENTS

| | | | |
|---|---|---|---|
| 3,373,340 | 3/1968 | Dirr et al. | 322/28 |
| 3,539,589 | 10/1970 | Bourgeault | 361/21 |
| 3,697,807 | 10/1972 | Christ | 361/21 |
| 3,938,005 | 2/1976 | Cummins | 361/21 |

*Primary Examiner*—Robert J. Hickey
*Attorney, Agent, or Firm*—Kenyon & Kenyon, Reilly, Carr & Chapin

[57] ABSTRACT

In a brushless synchronous generator with an exciter, in which the three phase armature winding of the generator is coupled through a series regulator to the field winding of the exciter, and in which the rotating armature of the exciter feeds the rotating field winding for the synchronous generator through rectifiers, the series regulator being coupled in series between the three phase windings of the generator and the field winding of the exciter and including a control element, and in which there is a bypass diode across the exciter field winding, in order to protect the control element, a protective device is disposed between the control element and the three phase winding and an overvoltage arrester is placed in parallel across the exciter field winding and the bypass diode, the overvoltage arrester operating if an overvoltage occurs, thereby causing increased current to be drawn to actuate the protective device in series with the control element thereby preventing the synchronous generator from reaching dangerous overvoltages if defects occur in the regulator.

8 Claims, 4 Drawing Figures

BRUSHLESS SYNCHRONOUS GENERATOR WITH AN EXCITER

BACKGROUND OF THE INVENTION

This invention relates to brushless synchronous generators in general and more particularly to an improved protective device for a brushless rotating synchronous generator with an exciter.

Brushless synchronous generators are known in which the synchronous generator contains a three phase armature winding in its stator and has its field winding in the rotor. Co-rotating therewith is a three phase exciter armature with the voltage from the exciter armature supplied through rectifiers to energize the rotating field winding of the synchronous generator. The exciter is energized by a voltage taken from the three phase winding of the synchronous generator which, after rectification, is controlled by a series regulator. The series regulator is used to control the exciter field such that the synchronous generator is excited to provide a constant output voltage. A bypass diode is coupled in parallel across the exciter field winding.

Typically in such devices series regulation using a transistor regulator as a constant voltage generator, for example, is employed. With such voltage regulation and, if there is a defect in the regulator circuit, the full voltage from the synchronous generator can be applied to the exciter field winding which in turn causes an overvoltage to be applied to the field winding of the synchronous generator. As a result the machine voltage rises to a overvoltage value which is limited only by the saturation of the magnetic circuit. Such an overvoltage can be up to more than a 150% of the nominal voltage. In order to protect the consumers of the electricity supplied by the synchronous generator from such harmful overvoltages resulting from defects, the synchronous generator must be de-energized where such a defect occurs. However, on the other hand, de-energization must be prevented where an overvoltage occurs simply due to operational reasons such as, for example, switching off at full load.

SUMMARY OF THE INVENTION

In view of this, it is the object of the present invention to provide an arrangement in a generator of the type discussed above which protects the consumer against the consequences of regulating defects (such as a interruption of the actual value being fed to the regulator or a short in the control element) but at the same time prevents undesired de-energization of the generator when overvoltages occur due to normal operation. This is accomplished, according to the present invention, by placing an overvoltage arrester in parallel across the field winding of the exciter and by placing a protective device in the series regulator circuit which is supplying the field of the exciter. In this manner, if an overvoltage occurs because of a defective regulator, the overvoltage arrester responds placing a short across the field winding of the exciter and causing a large amount of current to be drawn to actuate the protective device. This prevents the defect from continuing to be felt at the exciter field winding and, at the same time, removes the excitation voltage from the exciter to shut down the generator.

Thus, in principal the present invention is based on short circuiting the regulator supply in the event of a distrubance. To accomplish this in a simple manner, an overvoltage arrester which is connected to the supply voltage is utilized for switching purposes with a fuse and/or delayed overvoltage protector, e.g., a circuit breaker, used to obtain permanent de-energization.

DETAILED DESCRIPTION OF THE INVENTION

Figure 1:
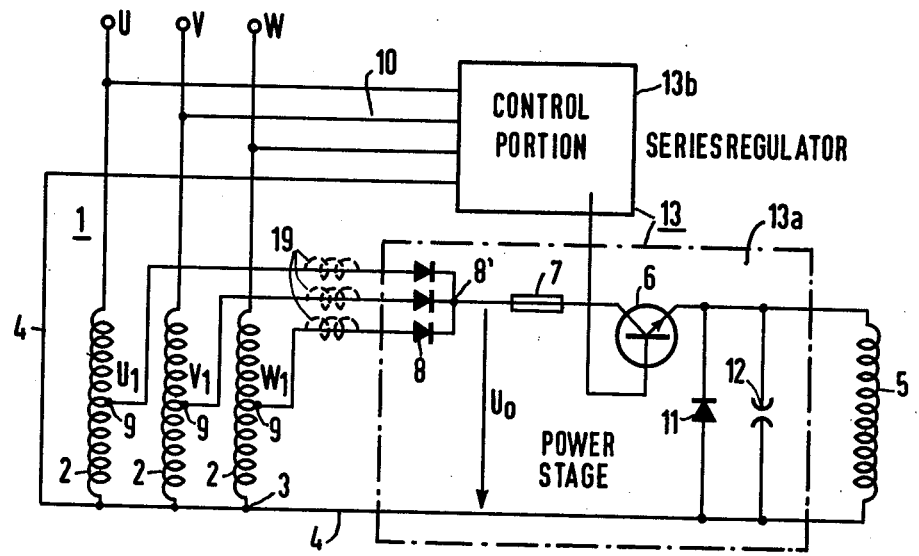
FIG. 1 is a block-circuit diagram of a synchronous machine with an exciter having a single field winding and employing the protective circuits of the present invention.

FIG. 1 illustrates, in a block-circuit diagram, a three phase synchronous machine having an exciter. The machine armature consists of three stator windings 2 which provide three phase output current on the lines U, V and W to load consumers, not shown on the figure. The three stator windings 2 are Y connected. The neutral point point 3 of the Y connection is coupled to one side of the stationary field winding 5 of the exciter. The other side of the exciter field winding 5 is fed through a transistor 6 which is contained in the power stage 13a of a voltage regulator 13. The input to the transistor 6 in the power stage 13a of the regulator is obtained from taps 9 on the stator winding 2 which are coupled through diode rectifiers 8, in a Y configuration having a Y neutral point 8'. The transistor 6 in the power stage 13a of the regulator is controlled by a control portion 13b of the regulator. In conventional fashion the control portion 13b receives as inputs on lines 10 the actual value of the voltage being supplied to the consumers. This voltage, after any necessary retification, represents the actual value. The control portion 13b will also include means for setting in a desired value of voltage. In conventional fashion these two voltages are compared, typically in a proportional integral controller, to provide a control output to the base of the transistor 6. Since this portion of the design is conventional it is not described in detail herein. The field winding 5 of the exciter cooperates with the rotating armature 14 of the exciter to generate a three phase voltage. This three phase voltage is rectified in a rectifier 15 and supplied to the rotating field winding 16 of the three phase synchronous machine. A bypass diode 11 is placed in parallel across the field winding 5.

What has been described thus far is conventional in machines of this nature. However, in accordance with the present invention there is also provided in parallel with the diode 11 and field winding 5 an overvoltage arrester 12. In addition, a protective device 7 such as a fuse is placed in series with the transistor 6 between it and the neutral point 8' of the rectifier 8. Thus, in the arrangement of the present invention the power stage 13a of the regulator includes the diode rectifiers 8, the transistor 6, the bypass diode 11, and the overvoltage arrester 12.

In normal operation, the power stage 13a of the regulator 13 is fed with a supply voltage $U_o$, rectified in the diode circuit 8, from the synchronous generator 1. If a defect occurs, the transistor 6 can become fully conductive connecting the full voltage $U_o$ to the field winding 5. Such could happen if the transistor 6 melted or if the actual value at the control portion 13b of the regulator was missing. At no load (worst case) the voltage without the protective measures according to the present invention, is about five to seven times as high as the value required to generate the nominal output voltage of the generator. As a consequence, the exciter current and, thereby, the generator voltage increase. The generator voltage then reaches a steady state which is limited only by the saturation of the magnetic circuit. This steady state voltage is approximately 150 to 170% of the nominal voltage. If a regulator defect occurs at full load of the synchronous generator, lower overvoltages will occur and will generally will not pose any danger to the consumer. However, regulator defects occurring in partial load situations can also lead to overvoltages which are dangerous to the consumers.

However, this danger is eliminated by the arrangement of the present invention. The synchronous generator, upon such a defect occurring, is de-energized through the response of the overvoltage arrester 12 and the protective device 7. The voltage at the taps 9 of the stator winding 2, which supplies the power stage 13a of the regulator, is an image of the peak value of the terminal voltage of the synchronous generator. Thus, after being rectified, the half-waves of rectified voltage $U_o$ have an amplitude corresponding to the voltage taken off at the taps 9 of the stator winding 2. The maximum permissible overvoltage at the machine terminals of the synchronous generator in the event of a regulator defect can therefore set by a suitable choice of the voltage of the overvoltage arrester 12. This can be accomplished particularly well in a gas filled arrester. Once the response voltage is reached, the overvoltage arrester 12 goes into conduction causing the voltage $U_o$ to drive a current through the diode circuit 8, the protector 7, e.g., a fuse, the transistor 6 and the overvoltage arrester 12. This current is a short circuit current many times larger than the excitation current normally flowing through the field winding and as a result will cause the fuse 7 or other protective device to respond and interrupt the excitation current to thereby de-energize the synchronous generator.

On the other hand, when operational overvoltages occur the transistor 6 is cut off by the control portion 13b and in this manner the field winding no longer receives the voltage $U_o$. The excitation current which is impressed flows through the bypass diode 11. This small voltage drop at the bypass diode 11 cannot make the overvoltage arrester 12 respond.

Figure 2:
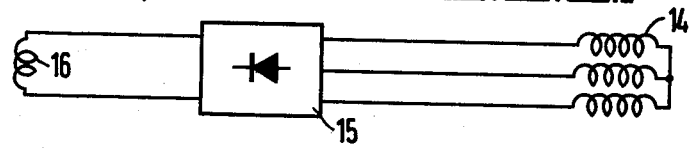
FIG. 2 is a similar diagram for a machine in which the exciter has two field windings which are permeated in opposite directions by the field current.
Figure 2:
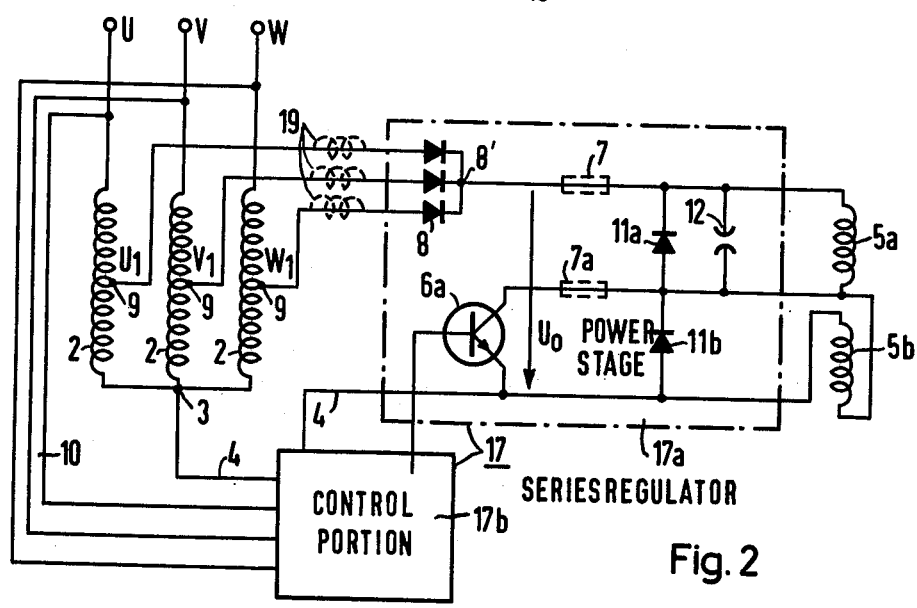

FIG. 2 illustrates an additional embodiment of the present invention. In this embodiment, the exciter machine has two field windings 5a and 5b for purposes of excitation. These are connected to each other in a conductive manner and permeated in opposite directions by the current. The current in the winding 5a is in the same direction as the current in the rest of the circuit and that in winding 5b in the opposite direction. The windings 5a and 5b are coupled to a series regulator of conventional design. The series regulator includes a control portion 17b and a power state 17a. In the diagram of FIG. 2, the windings 14 and 16 and diode rectifier 15 are not shown. However, it will be recognized by those skilled in the art that such are present.

There is a bypass diode shunted across each field winding in the embodiment of FIG. 2. Thus, there is a diode 11a shunted across the field winding 5a and a diode 11b shunted across the fielding winding 5b. Furthermore, an overvoltage arrester 12 is placed in parallel across the field winding 5a. The transistor 6a is coupled in parallel across the field winding 5b. At this point it should be noted that although a single transistor is shown, the transistor regulator can consist of a plurality of transistors connected in parallel. As in the embodiment of FIG. 1 actual values are fed on the lines 10 to the control portion 17b of the regulator 17 to develop a control output for the transistor 6a.

In normal operation, with the transistor 6a conducting, the excitation current which is caused to flow in the power stage by the voltage $U_o$ taken off the taps 9 of the stator winding 2 of the synchronous generator flows from the common point 8' at the Y connected diodes 8 through a fuse 7, through the field winding 5a of the exciter and through the transistor 6 and then through the conductor 4 back to the common neutral point 3 of the windings 2.

If the transistor 6a is cut off because of an overvoltage at the output of the generator, the excitation current in the field winding 5a decays through the bypass diode 11a and at the same time the field winding 5b which has a current flow in the opposite direction to that of the field winding 5a, is connected by means of the bypass diode to the supply voltage $U_o$ causing the total flux to be broken down faster and improving the dynamic behavior of the system consisting of the regulator and the generator.

If the regulator fails, e.g., because of a short circuit or missing actual value, increased voltage will appear at the field winding 5a resulting in a response of the overvoltage arrester 12 and the fuse 7 in the manner described above in connection with FIG. 1. This results in the de-energization of the synchronous generator. However, in the case of normal load transients, the described protection does not respond for the same reason given above.

A faster de-energization with the same protective effect can be achieved when both field windings 5a and 5b have the same number of turns and a fuse 7a is connected directly in series with the transistor 6 in place of a fuse 7.

It is possible to combine the circuit of FIG. 1 as well as that of FIG. 2 with known types of overvoltage protection devices which switch off with a delay, i.e., a slow blow type of protective device, for the synchronous generator. In such a case, the fuse 7 or 7a can be omitted. With such a device, if a predetermined voltage is exceeded over a given amount of time, the device responds by switching off and de-energizes the entire machine system thereby giving protection against external and/or internal overvoltages as long as the regulator is operative. The regulator 13 or 17, as the case may be takes over, as the second stage, the voltage limiting and fast de-energizing if the transistor 6 or 6a is defective. Since in this case a relatively large short circuit current through the overvoltage arrester 12 and, thus also in the tapped part of the winding, limits the terminal voltage to a maximum value given by the response voltage of the overvoltage arrester, a fuse can be omitted and, with a properly chosen delay, the overvoltage protection device can be used to switch the excitation off.

The short circuit current in the regulator 13 or 17 which occurs in case of regulator defect is normally considerably larger than the operational exciter current. It corresponds to the short circuit current which can develop at the tap 9 of the stator winding 2 and is therefore in the same order of magnitude as the maximum short circuit current at the machine terminal of the synchronous generator 1. In order to avoid secondary damage to the parts of the regulator 13 or 17, particularly to the diode circuit 8, these parts of the regulator must be overdesigned considerably as compared to requirements for normal operating conditions.

Figure 3:
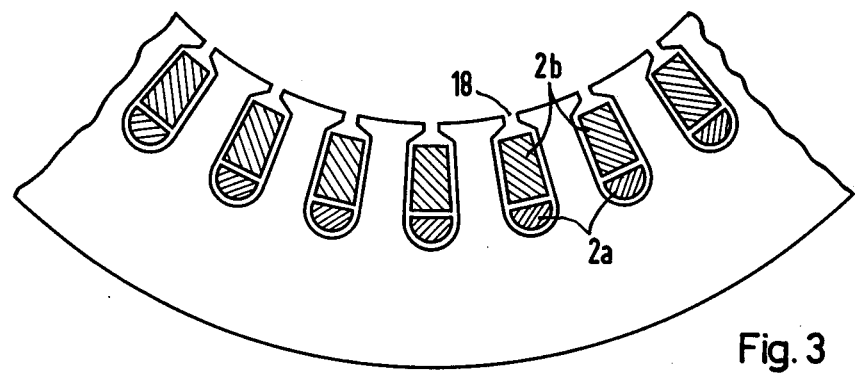
FIG. 3 is a schematic corss sectional view illustrating the arrangement of a stator winding with tapped winding parts at the bottom of the slots in accordance with the present invention.

In order to minimize the amount of overdesign necessary, which overdesign naturally increases cost, in accordance with a further measure according to the present invention, the maximum short circuit current is reduced. Without adversely affecting the protective function of the present invention, the leakage reactances of the winding portions of the stator winding located between the neutral points 3 and the taps 9, these portions being designated 2a on FIG. 3, can be increased substantially, for example, by placing the stator winding parts 2a in the bottom of slots 18 in the stator as illustrated by FIG. 3. The remaining stator winding parts, i.e., those parts of the stator winding between the taps 9 and the output terminals U, V and W are then arranged in the tops of the slots. An alternative manner of achieving of the same purpose is through the use of current limiting chokes 19 such as those shown in dotted lines on FIGS. 1 and 2. These, are illustrated, are inserted between the taps 9 and the diodes 8.

Figure 4:
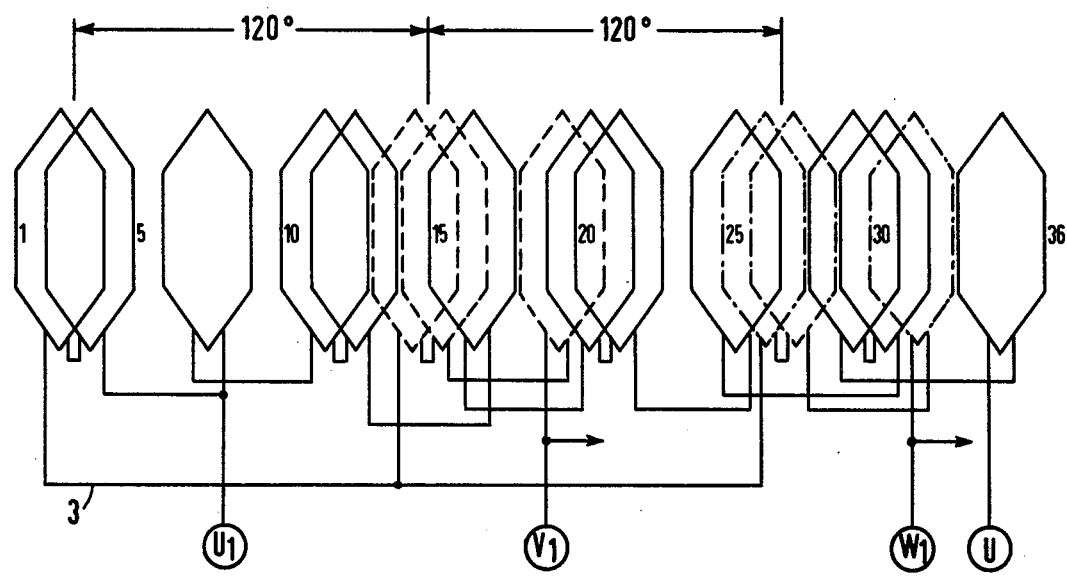
FIG. 4 is a diagram illustrating the arrangement of a stator winding according to the present invention which achieves improved protective response.

A particularly simple measure for achieving current limiting, which is very effective particularly in a synchronous generator with a large number of poles, is to utilize the harmonic leakage reactance. In order to do this, the tapped stator winding parts are concentrated at individual zones of the circumference of the stator. By doing this, considerably reduced the short circuit currents are obtained at the taps, in the event of a short circuit, due to the interaction of the field winding 16 which is uniformly distributed over the entire circumference of the machine. An example of such an arrangement is shown on FIG. 4 for a 8 pole, two layer winding with 36 slots. In this example the tapped stator winding parts equal one quarter of the total winding. There are first shown three coils, the upper layer sides of which, with a completely depicted phase U, lie in the slots 1, 2 and 6. Only the respective tapped winding parts for the other phases V and W are shown on the figure. The designation $U_1$, $V_1$ and $W_1$ correspond to the same designation at the taps 9 of FIGS. 1 and 2. The tapped winding parts having the taps $U_1$, $V_1$ and $W_1$ are spatially displaced 120° relative to each other.

The subtransient reactance $X_d''$ limiting the maximum short circuit current is determined from the stator leakage reactance $X_{1\sigma}$, the rotor leakage reactance $X_{2\sigma}$ and the coupling via the stray reactance $X_h$ according to the following equation:

$$X_d'' = X_{1\sigma} + (X_h \cdot X_{2\sigma})/(X_h + X_{2\sigma}).$$

In the normal case $X_h$ is about one order of magnitude larger than the leakage reactances $X_{1\sigma}$ and $X_{2\sigma}$.

Due to the spatially concentrated arrangement of the tapped stator winding part mentioned, the magnetic coupling with the main reactance of the field winding in the rotor is confined substantially to these circumference zones, while the remaining zones of the rotor of the synchronous generator become leakage paths which magnetize the main circuit (harmonic leakage).

A component $\Delta X$ depending on the extent of the tapped stator winding part of the main reactance $X_h$ becomes the leakage reactance in this case so that, taking into consideration that $X_h > \Delta X > X_{2\sigma}$, a substantially larger subtransient reactance, which reduces the short circuit current correspondingly is obtained in accordance with the following equation:

$$X_d'' = X_{1\sigma} + ((X_h - \Delta X) \cdot (X_{2\sigma} + \Delta X))/(X_h + X_{2\sigma}).$$

An arrangement which is particularly advantageous in this respect consists of arranging the tapped stator winding parts in each phase concentrated as much as possible spatially and of constructing the three phases U, V and W identically and displacing them spatially by 120°, so that the mutual coupling of the three tapped stator winding parts is minimized and the synchronous generator is of a symmetrical construction.

What is claimed is:

1. In a brushless synchronous generator, with an exciter, the synchronous generator have three phase armature windings in its stator and a rotating field winding which is fed through a rectifier circuit by the corotating armature winding of the exciter, the outputs of the stator windings of the generator being coupled through a rectifier and series regulator having a control element to the stationary field winding of the exciter, the series regulator regulating the generator so as to maintain a constant output voltage, a bypass diode being shunted across the field winding of the exciter, an improved arrangement for protecting consumers of the output of the synchronous generator against over-voltages occurring because of a defective regulator comprising:
   (a) an overvoltage arrester for shorting the exciter field winding shunted in parallel across the exciter field winding and in parallel with the bypass diode, said overvoltage arrester having a response voltage causing it to respond if the operationally permissible overvoltage is exceeded; and
   (b) a protective device in the regulator circuit, whereby when said permissible overvoltage is exceeded said overvoltage regulator arrester responds shorting the field winding it causes a short circuit current to flow in the regulator to result in a response of the protective device to permanently interrupt current to the generator excitation circuit to shut it down.

2. The improvement according to claim 1, wherein said protective device comprises a fuse in series with the control element of said regulator.

3. The improvement according to claim 1, wherein said exciter has two field windings permeated respectively in a normal direction and an opposite direction and wherein each of said field windings is shunted by a bypass diode, said overvoltage arrester being disposed only across one of said windings and wherein both of said windings have associated therewith the control element of said regulator and said protective device comprises a fuse in series with said control element.

4. The improvement according to claim 3 wherein both of said field winding have the same number of turns and wherein said control element is shunted across the field windings permeated in the opposite direction.

5. The improvement according to claim 1 wherein said exciter field winding is fed from a portion of the stator windings of the generator via taps thereon and wherein the stator winding portions feeding the exciter have increased leakage reactance.

6. The improvement according to claim 5 wherein said winding portions feeding the exciter are disposed in the bottom of the stator slots with the remaining stator windings portions disposed on top thereof.

7. The improvement according to claim 5 wherein said stator winding portions feeding the exciter machine are arranged so as to be spatially concentrated at isolated zones of the circumference of the stator.

8. The improvement according to claim 7 wherein the three phases of stator winding are of identical design and are spatially displaced from each other by 120°.

* * * * *